US006482885B1

(12) United States Patent
Müller et al.

(10) Patent No.: US 6,482,885 B1
(45) Date of Patent: Nov. 19, 2002

(54) COATING COMPOSITION COMPRISING DIVERSE ANIONIC POLYURETHANE-POLYUREA DISPERSIONS

(75) Inventors: Hanns-Peter Müller, Odenthal (DE); Horst Gruttmann, Leverkusen (DE); Joachim Petzoldt, Monheim (DE); Heino Müller, Leverkusen (DE); Jürgen Meixner, Krefeld (DE); Gerald Kurek, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 309 days.

(21) Appl. No.: 09/628,875

(22) Filed: Jul. 24, 2000

(30) Foreign Application Priority Data

Jul. 30, 1999 (DE) .......................................... 199 43 933

(51) Int. Cl.⁷ .......................... C09D 5/00; C09D 175/04
(52) U.S. Cl. ...................... 524/501; 524/591; 524/839; 524/840; 525/453; 525/509; 525/540
(58) Field of Search ................. 524/501, 591, 524/839, 840; 525/453, 509, 540

(56) References Cited

U.S. PATENT DOCUMENTS 4,086,193 A * 4/1978 Reischl ....................... 521/137
4,501,852 A * 2/1985 Markusch et al. ........... 524/591
4,745,151 A 5/1988 Noll et al. ................... 524/591
4,764,555 A 8/1988 Shigemitsu et al. .......... 525/67
5,252,671 A 10/1993 Predain et al. .............. 525/124
5,422,186 A * 6/1995 Biggeleben et al. ....... 428/423.1
5,965,195 A * 10/1999 Muller et al. ................ 427/155
6,172,126 B1 1/2001 Müller et al. ................. 521/49

FOREIGN PATENT DOCUMENTS

WO        98/23692        6/1998

\* cited by examiner

Primary Examiner—David W. Wu
Assistant Examiner—Kelechi Egwim
(74) Attorney, Agent, or Firm—Joseph C. Gil; Thomas W. Roy

(57) ABSTRACT

The present invention relates to coating compositions comprising a mixture of at least two aqueous, anionic polyurethane polyurea dispersions A and B, wherein dispersion A as a dry film has a TG in the range from −30° C., to −45° and dispersion B as a dry film has a first TG in the range from −30° C. to −45° C. and a second TG in the range from +45° C. to +60° C., and the mixture of A and B as a dry film has only one TG in the range from −30° C. to −45° C.

14 Claims, No Drawings

COATING COMPOSITION COMPRISING DIVERSE ANIONIC POLYURETHANE-POLYUREA DISPERSIONS

BACKGROUND OF THE INVENTION

1. Field of the Invention

The present invention relates to light-stable coating compositions containing a mixture of at least two mutually compatible cosolvent-free, aqueous, anionic dispersions A and B of polyurethane polyureas.

The present invention also relates to recyclable strippable coating compositions consisting of at least two different cosolvent-free, aqueous, anionic dispersions A and B of polyurethane polyureas, a process for their production and their use as coating compositions, preferably as strippable coating compositions for the temporary protection of motor vehicles, aircraft, steel and aluminium profiles, glass and plastics discs and arbitrary other substrates, and processes for the recovery of the used stripped coating layers.

2. Description of the Prior Art

Anionic polyurethane polyurea dispersions are known. Cosolvent-free, aqueous, anionic polyurethane dispersions, processes for their production and their use as coating compositions, coating agents, adhesives and strippable coating compositions are also known. DE-A 19 653 585, describes polyurea dispersions which after physical drying at 20° to 100° C., preferably at 20° to 80° C., provide transparent, high-gloss UV-resistant, temperature-resistant (−30° to 80° C.) coatings that are resistant to precipitations (of an organic or inorganic nature), and that on the one hand bond well to substrates and on the other hand can easily be removed by stripping. The tear strength and elongation of the coatings layers are appropriately high. A coatings dispersion that can be obtained according to DE-A 19 653 585 is denoted hereinafter as dispersion A.

Mixtures of polyolefins used as strippable coating compositions for automobiles are known from WO 98/23692. However these mixtures do not contain any polyurethane (PUR) constituents. The strippable coatings described therein are also not recyclable.

There is a need for a higher hardness and lower elongation of the polyurethane ureas A used as recyclable strippable coating compositions.

Accordingly, an object of the present invention is to provide new aqueous anionic polyurethane polymers that can be used without any problem and in an environmentally friendly manner and that produce coating compositions and coatings that satisfy requirements with regard to mechanical properties, weathering, light-resistance, transparency, temperature resistance, strippability, water resistance, resistance to precipitations (of an organic and inorganic nature) and recyclability and which also exhibit a high hardness and low elongation.

One possibility of producing a higher degree of hardness of the dried coating layers is to branch the polymer molecules. Branched polyurethane polyureas, such as are described in EP-A 242 731, have such a high hardness that they are used for producing coatings for hard, non-flexible substrates, for example as parquet coatings. When applied in a cosolvent-free manner to glass plates, the satisfactorily adhering coating layers exhibit cracks after drying at room temperature. These coating layers are not strippable as a film. A dispersion produced from EP-A 242 731 is denoted hereinafter as dispersion B.

It has now surprisingly been found that the desired application properties are obtained if at least two mutually miscible, cosolvent-free, aqueous anionic dispersions A and B of polyurethane polyureas are mixed, whose dry films A have a glass transition temperature Tg in the range from −30° to −45° C. and dry films B have a first Tg in the range from −30° to −45° C. and a second Tg in the range from +45° to +60° C., and the mixture of A and B as a dry film has only one Tg in the range from −30° to −45° C.

It is extremely surprising that a mixture of dispersions A and dispersions B forms coherent, strippable and recyclable films, since the person skilled in the art must have expected that the good adhesion of the dispersion B would also be transferred to the coating composition mixture of dispersion A and B, impeding strippability. This, however, is not the case. With the mixtures according to the invention, high-gloss, highly transparent and hard coating layers are obtained having a high filling capacity and good strippability and recyclability.

SUMMARY OF THE INVENTION

The present invention relates to light-stable coating compositions comprising a mixture of at least two cosolvent-free aqueous, anionic dispersions A and B of polyurethane polyureas, wherein polyurethane dispersion A as a dry film has a Tg in the range from −30° to −45° C. and the polyurethane dispersion B as a dry film has a first Tg in the range from −30° to −45° C. and a second Tg in the range from +45° to +60° C., and the mixture of A and B as a dry film has only one Tg in the range from −30° to −45° C.

The present invention also relates to light-stable coatings applied in the form of a mixture of at least two mutually compatible aqueous dispersions to arbitrary substrates and are dried at temperatures of up to 150° C.

The present invention also relates to a process for producing the light-stable coating compositions according to the invention, wherein at least two different cosolvent-free, aqueous, anionic dispersions A and B of polyurethane polyureas are prepared separately and aqueous dispersions A and B are then mixed in weight ratios of 50 to 90, preferably 55 to 85 parts of A to 10 to 50, preferably 15 to 45 parts of B (based on solids).

The present invention further relates to the use of mixtures of the aqueous dispersions A and B for preparing high-gloss, light-stable, water-resistant, solvent-free coatings for protecting vehicles, steel, aluminium and metal objects of all types, glass and plastics of all types, mineral substrates, brickwork or natural stones, for preventing corrosion of ships, bridges, aircraft and railways, and for protecting wood and natural objects and other substrates by dipping, knife coating, casting, spraying, brushing or injection, followed by drying at 20° to 150° C.

The present invention relates to the use of mixtures of the aqueous dispersions A and B as recyclable strippable coating compositions for the temporary protection of vehicles, railways, ships, furniture, metal objects, mineral objects, glass and plastics objects and other substrates by dipping, knife coating, casting, spraying, brushing or injection, followed by drying at 20° to 100° C., preferably 20° to 80° C., by heat or infra-red light, microwave irradiation or sonic irradiation.

The present invention also relates to the use of the used, stripped coatings according to the invention as recycled material, wherein the used, stripped coatings are mechanically comminuted, optionally after prior cleaning, are dissolved, optionally while heating, in acetone, water and neutralizing agents, preferably ammonia, the acetone is optionally distilled off under reduced pressure, and the recovered stripped coating composition is obtained in the form of an aqueous dispersion for renewed use.

The present invention also relates to the use of the used, stripped coating layers according to the invention as recycled material, wherein the used, stripped coating layers are mechanically comminuted, optionally after prior cleaning, and are then compressed in heatable presses under application of temperature and pressure to form polyurethane plates, or the comminuted coating layers are extruded in an extruder under application of temperature, shear forces and conveying, into thermoplastic endless strands, and the resultant strands are granulated by known granulation methods into cylindrical, spherical, lens-shaped or lozenge-shaped granulates.

The present invention also relates to strippable coatings for the temporary protection of motor vehicles, aircraft, steel and aluminium profiles, glass and plastics discs and arbitrary other substrates.

Finally, the present invention relates to the use of the resultant granulates for producing industrial and technical articles as thermoplastic elastomers by further processing in known plastics technology processes, for example by injection moulding, blow moulding, thermoforming, slush moulding or flat extrusion.

DETAILED DESCRIPTION OF THE INVENTION

Suitable dispersions A for the light-stable coating compositions according to the invention include cosolvent-free, aqueous, anionic dispersions of polyurethane polyureas, whose solids contain the reaction product, present at least partially in the salt form, of a) an NCO-prepolymer prepared from
  i) 20 to 60 wt. % of a diisocyanate selected from aliphatic diisocyanates, cycloaliphatic diisocyanates and mixtures thereof,
  ii) 20 to 80 wt. % of a macrodiol having a number average molecular weight of 500 to 10000,
  iii) 2 to 12 wt. % of 2,2-bis-(hydroxymethyl)-alkanemono-carboxylic acids, preferably dimethylolpropionic acid,
  iv) 0 to 15 wt. % of short-chain diols with a molecular weight of 62 to 400,
  v) 0 to 10 wt. % of monohydric alcohols as chain regulators with a molecular weight of 32 to 350,
b) 0 to 15 wt. % of diamines in the molecular weight range of 60 to 300 as chain extenders,
c) 0 to 10 wt. % of chain regulators selected from the group of monoamines, alkanolamines and ammonia,
d) 0 to 3 wt. % of water, and
e) 0.1 to 10 wt. % of neutralizing agents, wherein the preceding percentages total 100% provided that in the prepolymer stage a) the calculated NCO content is 65 to 85%, preferably 75 to 80%, of the theoretical NCO content.

Suitable dispersions B for the light-stable coating compositions according to the invention include cosolvent-free, aqueous, anionic dispersions of polyurethane polyureas whose solids contain the following reaction product, present at least partially in the salt form, of:

a) a NCO prepolymer prepared from
  i) 20 to 60 wt. % of a diisocyanate selected from the group of aliphatic diisocyanates, cycloaliphatic diisocyanates and mixtures thereof,
  ii) 10 to 80 wt. % of a macrodiol with a number average molecular weight of 500 to 10000,
  iii) 2 to 12 wt. % of 2,2-bis-(hydroxymethyl)-alkanemonocarboxylic acids, preferably dimethylolpropionic acid,
  iv) 0 to 15 wt. % of short-chain diols and triols with a molecular weight of 62 to 400,
  v) 0 to 10 wt. % of monohydric alcohols as chain regulators with a molecular weight of 32 to 2500,
b) 0 to 15 wt. % of diamines and triamines in the molecular weight range of 60 to 300 as chain extenders
c) 0 to 10 wt. % of chain regulators selected from monoamines, alkanolamines and ammonia,
d) 0 to 3 wt. % of water, and
e) 0.1 to 10 wt. % of neutralizing agents, wherein the preceding percentages add up to 100% provided that the branching is achieved with triols and/or triamines, that is not both a iv) and b) may not be zero.

Dispersions A and B contain the components described in more detail hereinbelow; the specific features of the dispersions A and B are disclosed thereafter.

Component a) i) is selected from aliphatic and/or cycloaliphatic diisocyanates, such as isophorone diisocyanate (IPDI), 4,4'-dicyclohexylmethane diisocyanate, 1-methyl-2,4-diisocyanato-cyclohexane and/or 1-methyl-2,6-diisocyanatocyclohexane, 1,6-hexamethylene diisocyanate and/or 1,3-cyclohexane diisocyanate.

The use of small proportions of aromatic diisocyanates such as 2,4- and 2,6-toluene diisocyanate or 2,4'- and 4,4'-diphenylmethane diisocyanate, is also possible.

As component a) ii) macrodiols with a number-average molecular weight of 500 to 10000 are used. These macrodiols are preferably polyester diols obtained by reacting dicarboxylic acids with diols, optionally with the aid of conventional esterification catalysts, preferably by melt condensation or azeotropic condensation at temperatures of 140°–240° C.

Examples of suitable acids or anhydrides include adipic acid, succinic acid (anhydride), maleic acid (anhydride), sebacic acid, azelaic acids, the various commercially available dimeric fatty acids (in hydrogenated and non-hydrogenated form), phthalic acid (anhydride), isophthalic acid, tetrahydrophthalic acid (anhydride), 1,4-cyclohexanedicarboxylic acid and hexahydrophthalic acid (anhydride).

Examples of suitable diols are industrially available and include ethylene glycol, 1,2- and 1,3-propanediol, 1,3- and 1,4-butanediol, 1,6-hexanediol, diethylene glycol, dipropylene glycol, neopentyl glycol or mixtures of such diols. Polyester diols of adipic acid, hexanediol and neopentyl glycol are preferred.

Also suitable are polycarbonate diols, polycaprolactone diols, hydroxy-polytetrahydrofurans or hydroxypolyethers based on propylene oxide.

Suitable polycarbonate diols are obtained for example by reacting carbonic acid derivatives including diphenyl carbonate or phosgene with alcohols, preferably diols of the aforementioned type.

The number-average molecular weight of these polyols is between 500 and 10000, preferably between 700 and 4000, and more preferred between 1000 and 2500.

Starting components a) iii) are selected from 2,2-bis-(hydroxymethyl)-alkanemonocarboxylic acids having a total of 5 to 8 carbon atoms, i.e. compounds of formula (I)

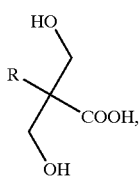

(I)

wherein

R represents an alkyl radical with 1 to 4 carbon atoms. 2,2-dimethylolpropionic acid is preferred.

Suitable starting components a) iv) include the previously described short-chain diols of molecular weight 62-400. 1,4-butanediol is preferred.

Suitable starting components a) v) include methanol, ethanol, butanol, hexanol, 2-ethylhexanol, octanol and dodecanol, and alcohols of molecular weight 32 to 350.

Suitable components b) include aliphatic and/or cycloaliphatic compounds having at least two amino groups reactive to isocyanates. Suitable compounds include ethylene diamine, propylene diamine, hexamethylene diamine, isophorone diamine, p-xylylene diamine, 4,4'-diaminodicyclohexylmethane and 4,4'-diamino-3,3'dimethyldicyclohexyl-methane.

Suitable components c) include ammonia, monofunctional amines such as methylamine, ethylamine, n-propylamine, isopropylamine, cyclohexylamine, octylamine, diethylamine, dibutylamine, and amino alcohols such as ethanolamine, diethanolamine and propanolamine.

Suitable as neutralizing agents e) include ammonia, N-methylmorpholine, dimethylisopropanolamine, triethylamine, dimethylethanolamine, methyldiethanolamine, triethanolamine, morpholine, tripropylamine, ethanolamine, diethanolamine, triisopropanolamine and, and N-ethyldiisopropylamine.

In a preferred embodiment components a) i), ii) and iii) are placed in a reactor and reacted under anhydrous conditions in a temperature range of 50°–1500° C., preferably 50°–110° C. The reaction mixture is then cooled and acetone as well as the short-chain diol (iv) and optionally monohydric alcohols (v) are added and the whole is heated until the NCO content of the mixture has fallen to a value of 65 to 85% of the theoretical NCO content. The NCO prepolymer is formed in this way. The reaction mixture is diluted with further acetone and the calculated amount of a mixture of diamine and chain terminator—dissolved in water—is added. In this way 90% of the NCO groups of the prepolymer are reacted with the chain extender, the diamine and the chain terminator, the rest will react with the water being present. The remaining isocyanate can be reacted with the water present to form the polyurethane polyurea according to the invention.

The polymer build-up reaction is preferably carried out without the use of catalysts, though it is also possible to use the catalysts known in isocyanate chemistry (for example tertiary amines such as triethylamine, tin compounds such as tin-II-octoate, and dibutyltin dilaurate and other known catalysts).

When no more NCO can be detected (IR measurement) the calculated amount of neutralizing agent, preferably ammonia solution, is added to the reaction mixture so that 50–60% of the carboxyl groups present are neutralized by the ammonia.

The desired solids concentration is adjusted by adding water followed by removal of the acetone by distillation. Polyurethane polyurea dispersions that are obtained according to the process of the invention contain 20–60 wt. % of solids, preferably 30–40 wt. % of solids in water, and their mean particle diameters are 20–1000 nm, preferably 50–500 nm.

The pH of the white, storage-stable polyurethane polyurea dispersions according to the invention is in the range from 6 to 9.

Suitable dispersions B are obtained according to the known processes of the prior art. Methods for producing such branched polyurethane plastics are described for example in EP-A 242 731 (corresponding to U.S. Pat. No. 4,745,151 hereby incorporated by reference). EP-A 269 972 (corresponding to U.S. Pat. No. 4,764,555) hereby incorporated by reference) discloses polyurethane polyurea dispersions modified by monohydric polyether alcohols and neutralized with ammonia. Dispersions B contain branching compounds. Example include triols such as trimethylolpropane and glycerol, or triamines such as diethylenetriamine.

The preferred polyether alcohols are monofunctional, contain ethylene oxide and optionally propylene oxide, are preferably started on n-butanol and have mean molecular weights of 250 to 2500. Since these polyether alcohols act as non-ionic hydrophilic groups, they preferably contain more than 50 wt. % of ethylene oxide in the chain.

Dispersions A and B may be blended with other anionic or non-ionic dispersions. Examples include with polyvinyl acetate, polyethylene, polystyrene, polybutadiene, polyvinyl chloride, polyacrylate and copolymer plastics dispersions.

Dispersions A and B are mixed in a resin solids ratio of 50 to 90 parts of A to 10 to 50 parts of B, preferably 55 to 85 parts of A to 15 to 45 parts of B.

The desired pH of the mixtures may optionally be adjusted with organic or inorganic bases, such as ammonia, alkali metal carbonates, amines or amino alcohols. Organic bases are preferred. 2-amino-2-methyl-1-propanol is especially preferred.

Known additives used in coating composition chemistry, such as pigments, light stabilisers, anti-settling agents, thickeners, surfactants, and defoaming agents, may be used in the formulation of the coating compositions.

The coating compositions are applied by the conventional methods used in coatings technology, i.e. dipping, knife coating, casting, spraying, injection, brushing, painting or rolling.

The coatings according to the invention are water-resistant, transparent, tear-resistant, UV-resistant, temperature-resistant, precipitation-resistant (against precipitations of an organic or inorganic nature) and optionally pigmented coatings that on the one hand adhere to the substrates, and on the other hand can easily be removed by stripping.

The coating compositions serve as strippable coatings for the temporary protection of vehicles, steel and aluminium profiled parts, glass and plastics discs and articles. After application the coated parts are dried at room temperature or at elevated temperatures of up to 150° C./(100 ??).

If the polyurethane urea dispersions according to the invention are dried for up to 30 minutes at 140°–150° C. then coatings are obtained that adhere well to the substrates. Drying temperatures above 150° C. are also possible, although the use of such high temperatures is in general not economical.

The recycling of the used, stripped coatings is very simple. The stripped coatings layers are mechanically comminuted, optionally after prior cleaning, dissolved in acetone in a reaction vessel, optionally under heating, and optionally filtered after dissolution. The calculated amount of neutralizing agent, preferably ammonia, is added, and the whole is diluted with water to the desired solids content of the aqueous polyurethane polyurea dispersion. Finally, the acetone is optionally distilled off under reduced pressure.

Another method of recycling the used, stripped coating layers is to mechanically comminute the used, stripped coating layers, optionally after prior cleaning, and then press the comminuted material in heatable presses under the application of temperature and pressure to form polyurethane plates. It is also possible to extrude the comminuted coating layers in an extruder under the application of temperature, shear forces and conveying, into endless thermoplastic strands and granulating the resultant strands according to known granulation methods into cylindrical, spherical, lens-shaped or lozenge-shaped granulates. Such granulates are used as thermoplastic elastomers in the production of industrial articles by further processing in known processes used in plastics technology, for example by injection molding, blow molding, thermoforming, slush molding or flat extrusion.

The invention is further illustrated but is not intended to be limited by the following examples in which all parts and percentages are by weight unless otherwise specified.

EXAMPLES

Example 1

Dispersion A 170 g (0.1 mole) of a polyester of adipic acid, 1,6-hexanediol and neopentyl glycol (molar ratio of glycols 65:35) with a number average molecular weight of 1700 g/mole and 2% OH groups were dewatered in a reaction vessel at 120° C. and 10 mbar while stirring. 13.4 g (0.1 mole) of dimethylolpropionic acid and 111 g (0.5 mole) of isophorone diisocyanate were added under nitrogen. After one hour reaction time at 110° C. the reaction mixture was cooled to 60° C. and dissolved in 100 g of acetone. After adding 18 g (0.2 mole) of 1,4-butanediol the reaction mixture was stirred for 22 hours at 50° C. The NCO content was 1.60% (calculated 2.04%). The reaction mixture was diluted with 500 g of acetone. A mixture of 10.6 g (0.062 mole) of isophorone diamine, 1.07 g (0.016 mole) of 25% ammonia solution and 60 g of water were added at 50° C. to the NCO prepolymer. The whole was then stirred for 5 hours at 50° C. The reaction mixture was neutralized with 3.4 g (0.05 mole) of 25% ammonia solution and dispersed with 450 g of water. The acetone was removed at up to 50° C. and 150 mbar, and a white dispersion having a solids content of 39.2% and a mean particle size of 263 nm was obtained. The degree of neutralization was 50%. The Tg (glass transition temperature) of the dried film was −38.0° C.

DSC Measurements:

In order to achieve identical initial conditions, the samples were stored for 3 days under standard climatic conditions (SCC) and packed in tight, DSC capsules under standard climatic conditions. DSC equipment: Differential scanning calorimeter DSC-2 (Perkin-Elmer)

Two successive heating runs of −100° C. to +80° C. ($1^{st}$ heating run) and −100° C. to +120° C. ($2^{nd}$ heating run) heating rate 20° C./min, rapid cooling to the starting temperature of −100° C. between the runs, rinsing with nitrogen, weighed sample portions of between 12.9 mg and 13.3 mg in 30 µl capsules. Evaluation: ($2^{nd}$ heating run) glass transition (glass transition temperature, TG, as mean of the glass stage, height of the glass stage).

Example 2

Dispersion A

Example 1 was repeated except that ammonia was replaced as neutralizing agent with 3.56 g (0.04 mole) of dimethylethanolamine. After removing the acetone a white dispersion was obtained having a solids content of 35% and a mean particle size of 309 nm. The degree of neutralization was 40%.

Example 3

Dispersion A

Example 1 was repeated except that the reaction mixture was neutralized with 4.08 g (0.06 mole) of a 25% ammonia solution and was dispersed with 680 g of water. After removing the acetone a white dispersion was obtained having a solids content of 31.4% and a mean particle size of 183 nm. The degree of neutralization was 60%.

Example 4

Dispersion A 245.1 g (0.125 mole) of a polyester of adipic acid, 1,2-ethanediol and 1,4-butanediol (molar ratio of glycols 67:33) with an average molecular weight of 1961 g/mole and 1.73% of OH groups were dewatered in a reaction vessel for 30 minutes at 120° C. and 10 mbar. 16.75 g (0.125 mole) of dimethylolpropionic acid and 131 g (0.5 mole) of dicyclohexylmethane-4,4'-diisocyanate were added under nitrogen. After a 1 hour reaction time at 110° C. the reaction mixture was cooled to 80° C. and dissolved in 250 g of 2-butanone. After adding 11.25 g (0.125 mole) of 1,4-butanediol the reaction mixture was stirred for 12 hours at 80° C. The NCO content was 1.36% (calculated 1.61%). The reaction mixture was diluted at 50° C. with 500 g of acetone. A mixture of 13.6 g (0.08 mole) of isophorone diamine, 1.36 g (0.02 mole) of a 25% ammonia solution and 100 g of water was added at 50° C. to the NCO prepolymer. The whole was then stirred for 1 hour at 50° C. The reaction mixture was neutralized with 4.45 g (0.05 mole) of dimethylethanolamine and dispersed with 530 g of water. After removing the organic solvents at a temperature of up to 50° C. and 100 mbar, a white dispersion with a solids content of 38.7% and a mean particle size of 480 nm was obtained. The degree of neutralization was 40%.

Example 5

Dispersion A 170 g (0.1 mole) of the polyester from Example 1 were dewatered in a reaction vessel for 30 minutes at 120° C. and 10 mbar while stirring. 13.4 g (0.1 mole) of dimethylolpropionic acid and 111 g (0.5 mole) of isophorone diisocyanate were added under nitrogen. After a 1 hour reaction time at 110° C. the reaction mixture was cooled to 60° C. and dissolved in 100 g of acetone. After adding 18 g (0.2 mole) of 1,4-butanediol the reaction mixture was stirred for 21 hours at 50° C. The NCO content was 1.63% (calculated 2.04%). The reaction mixture was diluted with 500 g of acetone. A mixture of 1.09 g (0.016 mole) of a 25% ammonia solution and 60 g of water was added at 50° C. to the NCO prepolymer and the whole was stirred for 21 hours at 50° C. The reaction mixture was neutralized with 3.4 g (0.05 mole) of a 25% ammonia solution and dispersed with 450 g of water. After removing the acetone at a temperature of up to 50° C. and 150 mbar, a white dispersion was obtained having a solids content of 39.8% and a mean particle size of 210 nm.

Example 6

Dispersion B 60 g (0.035 mole) of a polyester of adipic acid, 1,6-hexanediol and neopentyl glycol (molar ratio of glycols 65:35) with an average molecular weight of 1700 g/mole, 90.5 g (0.108 mole) of a polyester of adipic acid and 1,6-hexanediol with an average molecular weight of 840 g/mole and 17.8 g (0.008 mole) of a polyether (initiated with n-butanol, containing 83% ethylene oxide and 17% propylene oxide and having an average molecular weight of 2240 g/mole) were dewatered in a reaction vessel for 30 minutes at 120° C. and 15 mbar. 20.75 g (0.155 mole) of dimethylolpropionic acid were added under nitrogen followed by the addition of 192 g (0.86 mole) of isophorone diisocyanate at 75° C. After stirring for three hours at 75° C., 13.25 g (0.147 mole) of 1,4-butanediol and 5.25 g (0.04 mole) of trimethylolpropane were added to the reaction mixture. After stirring for a further 3½ hours the NCO content was 7.5% (calculated 7.51% NCO). The prepolymer was dissolved in 992 g of acetone and reacted at 50° C. with a mixture of 16.3 g (0.27 niole) of ethylenediamine, 20.2 g (0.12 mole) of a 9.7% ammonia solution and 200 g of water. The whole was stirred for 4½ hours at 50° C., neutralized with a mixture of 13.6 g (0.078 mole) of a 9.7% ammonia solution and 10 g of water, and dispersed after a further 15 minutes stirring at 50° C. by adding 525 g of water. The acetone was removed by distillation at up to 50° C. and 150 bar. A white dispersion was obtained having a solids content of 35% and a mean particle size of 120 nm. The degree of neutralization was 50%.

The first Tg of a dried sample B was at −43.5° C. and the second Tg was at +56.5° C.

Example 7

Production of a Strippable Coating Composition a) Transparent Formulation 75.52 parts by weight of dispersion A from Example 1 (39.2% solids content) were premixed while stirring with 21.12 parts by weight of dispersion B (35% solids content) and were adjusted with approx. 0.33 parts by weight of 90% aminomethylpropanol to a pH of approx. 8.3.

0.37 parts by weight of a commercially available acrylate thickener (Borchigel A LA, 10% in distilled water), 1.11 parts by weight of a 1% commercially available defoamer (defoamer E, Bayer AG), 0.51 parts by weight of a wetting agent (Hydropalat 110, Henkel) and 1.04 parts by weight of a water-dilutable light stabilizer (Sanduvor 3055, Clariant GmbH) were then quickly added and thoroughly mixed by means of a dissolver. The system was ready for use, for example for an airless spray application, after approximately 8 hours maturation at 23° C. The Tg of a dried coating layer of dispersions A and B in the specified mixing ratio was −41° C.

b) White-Transparent Formulation 72.14 parts by weight of dispersion A from Example 1 (39.2% solids content) were premixed while stirring with 20.18 parts by weight of dispersion B (35% solids content) and adjusted with approx. 0.32 parts by weight of 90% aminomethylpropanol to a pH of approx. 8.3.

4.38 parts by weight of the grinding paste set forth below, 0.36 parts by weight of a commercially available acrylate thickener (Borchigel A LA, 10% in distilled water), 1.09 parts by weight of a 1% commercially available defoamer (defoamer E, Bayer AG), 0.51 parts by weight of a wetting agent (Hydropalat 110 Henkel) and 1.02 parts by weight of a water-dilutable light stabiliser were then quickly added and thoroughly mixed by means of a dissolver. The system was ready for use, for example for an airless spray application, after approximately 8 hours maturation at 23° C.

The grinding paste, which after a pre-dispersion by means of a dissolver was ground for about 30 minutes on a bead mill under cooling, contained 42.26 parts by weight of dispersion A, 11.77 parts by weight of dispersion B, 3.70 parts by weight of distilled water and 41.48 parts by weight of titanium dioxide (TRONOX R-KB-4, Kerr McGee Pigments GmbH), and 0.45 parts by weight of a wetting agent (Tego Wet 250, Tego Chemie) and 0.34 parts by weight of an anti-settling agent (Aeorosil R 972, Degussa).

Example 8

Recycling

A residual degree of neutralization of 2.8% was found by titrimetric measurement in a strippable coating film prepared from dispersions A and B in a weight ratio of 80:20. 300 g of this film were dissolved at 45° C. in 600 g of acetone and 90 g of water and then neutralized with 10.5 g of a 9.7% ammonia solution. The mixture was next dispersed with 360 g of water and the acetone was removed at up to 40° C. and 120 mbar. The white dispersion obtained had a solids content of 40.5% and a measured degree of neutralization of 58.5%. Films applied to glass with a 200 μm doctor blade were clear, shiny and strippable after drying at 80° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition comprising a mixture of at least two aqueous, anionic polyurethane polyurea dispersions A and B, wherein dispersion A as a dry film has a TG in the range from −30° C. to −45° C., and dispersion B as a dry film has a first TG in the range from −30° C. to −45° C. and a second TG in the range from +45° C. to +60° C., and the mixture of A and B as a dry film has only one TG in the range from −30° C. to −45° C.

2. The coating composition of claim 1 being co-solvent free.

3. The coating composition of claim 1, wherein aqueous, anionic dispersions A and B are Mixed in weight ratios of 50 to 90 parts A to 10 to 50 parts B, based on the resin solids of A and B.

4. The coating compositions of claim 1, wherein the two dispersions A and B are mixed in weight ratios of 55 to 85 parts A to 15 to 45 parts B, based the solids of A and B.

5. A coating obtained by applying a coating composition containing a mixture at least two aqueous, anionic polyurethane polyurea dispersions A and B, wherein dispersion A as a dry film has a TG in the range from −30° C. to −45° C., and dispersion B as a dry film has a first TG in the range from −30° C. to −45° C. and a second TG in the range from +45° C. to +60° C., and the mixture of A and B as a dry film has only one TG in the range from −30° C. to −45° C.

to substrates including vehicles, steel, aluminium and metal objects of all types, glass and plastics of all types, mineral substrates, brickwork or natural stones, for preventing corrosion of ships, bridges, aircraft and railways, and for protecting wood and natural objects and other substrates and drying at temperatures of up to 150° C.

6. The coating of claim 5 obtained by drying at temperatures between 20 to 100° C.

7. A process for obtaining a coating by applying the coating composition containing a mixture at least two aqueous, anionic polyurethane polyurea dispersions A and B, wherein dispersion A as a dry film has a TG in the range from −30° C. to −45° C., and dispersion B as a dry film has a first TG in the range from −30° C. to −45° C. and a second TG in the range from +45° C. to +60° C., and the mixture of A and B as a dry film has only one TG in the range from −30° C. to −45° C., followed by drying at 20° to 150° C.

8. The process of claim 7 wherein the drying is performed at 20° C. to 100° C.

9. The process of claim 7 wherein the drying is performed at 20° C. to 80° C.

10. The process of claim 7 wherein the drying is performed by heat or infrared light, microwave irradiation or sonic irradiation.

11. A process of recycling the coating of claim 5 including the steps of stripping the coating from the substrate, mechanically comminuting, and optionally after prior cleaning, dissolving in acetone, water and neutralizing agents, and optionally heating, distilling off the acetone optionally under reduced pressure, and the recovering a coating composition in the form of an aqueous dispersion.

12. A process of recycling a coating prepared from a coating composition containing a mixture at least two aqueous, anionic polyurethane polyurea dispersions A and B, wherein dispersion A as a dry film has a TG in the range from −30° C. to −45° C., and dispersion B as a dry film has a first TG in the range from −30° C. to −45° C. and a second TG in the range from +45° C. to +60° C., and the mixture of A and B as a dry film has only one TG in the range from −30° C. to −45° C.

including the steps of stripping the coating from the substrate, mechanically comminuting, optionally after prior cleaning, and then forming polyurethane plates, thermoplastic endless strands, or cylindrical, spherical, lens-shaped or lozenge-shaped granulates.

13. The process of claim 12 wherein the forming step includes pressing in heatable presses under increased temperature and pressure to form polyurethane plates.

14. The process of claim 12 wherein the forming step includes extruding the comminuted coating in an extruder under increased temperature, shear forces and conveying, into thermoplastic endless strands, and the resultant strands are granulated of known granulation methods into cylindrical, spherical, lens-shaped or lozenge-shaped granulates.

* * * * *